United States Patent [19]

Hiestand

[11] Patent Number: 4,667,972
[45] Date of Patent: May 26, 1987

[54] CHUCK MASTER JAW AND FALSE JAW CONSTRUCTION

[75] Inventor: Karl Hiestand, Pfullendorf, Fed. Rep. of Germany

[73] Assignee: SMW Schneider & Weisshaupt GmbH, Fed. Rep. of Germany

[21] Appl. No.: 657,339

[22] Filed: Oct. 3, 1984

[30] Foreign Application Priority Data

Oct. 12, 1983 [DE] Fed. Rep. of Germany ....... 3337047

[51] Int. Cl.$^4$ ............................................. B23B 31/00
[52] U.S. Cl. ................................... 279/123; 279/1 SJ
[58] Field of Search ...................... 279/1 SJ, 123, 110; 29/568; 82/2.5

[56] References Cited

U.S. PATENT DOCUMENTS

| | | | |
|---|---|---|---|
| 1,454,148 | 5/1923 | Bisset | 279/123 |
| 3,190,666 | 6/1965 | Testa | 279/123 |
| 3,345,012 | 6/1985 | Hiestand | 29/568 |
| 3,744,125 | 7/1973 | Schalles | 29/568 |

FOREIGN PATENT DOCUMENTS

| | | | |
|---|---|---|---|
| 2015102 | 10/1971 | Fed. Rep. of Germany | 279/123 |
| 2509698 | 9/1976 | Fed. Rep. of Germany | 279/123 |
| 2311622 | 12/1976 | France | 279/123 |
| 2480642 | 10/1981 | France | 279/123 |

Primary Examiner—Gil Weidenfeld
Assistant Examiner—Glenn L. Webb
Attorney, Agent, or Firm—McGlew and Tuttle

[57] ABSTRACT

In an arrangement for coupling a false jaw to a master jaw of a chuck, wherein a positive locking is effected by a radial displacement, the master jaw is provided with an extension having a stop surface and a projection. The false jaw has a recess for receiving the extension and a relief shoulder and is guided in the direction of rotation. Due to this arrangement, the false jaw is well supported and highly stable, so that strong forces can be transmitted, and a high repetitive accuracy in chucking is obtained.

13 Claims, 6 Drawing Figures

CHUCK MASTER JAW AND FALSE JAW CONSTRUCTION

FIELD AND BACKGROUND OF THE INVENTION

This invention relates in general to the construction of chucks and in particular to a new and useful arrangement for coupling a false jaw to a master jaw of a chuck.

German Pat. No. 21 04 904 discloses a chucking device for turning machines with a quick change of false jaws which can be coupled to the chuck by a radial displacement of the master jaws. In that design, each master jaw is designed with a longitudinal groove in its face turned to the false jaw, with the side walls of the groove being provided with interrupted lengthwise ribs, and array of pointed teeth or similar parts. The false jaws have a fitting feather provided with interrupted lengthwise ribs, a dentation or similar part. The spaces between the teeth, or ribs, are so dimensioned that the feather can be engaged into a groove of the master jaw by an axial motion, and then positively locked by a radial motion.

To provide the master jaw grooves with teeth, separate strips must be manufactured and screwed thereto. And since the feathers of the false jaws must also be secured by screws, a high instability cannot be avoided. Further, the manufacturing costs of mating dentations are considerable since a high accuracy is required for the fitting interengagement. The primary drawback, however, is that the false jaw applies to the master jaw in the direction of rotation almost exclusively through the lateral dentation. The clamping forces thus can be transmitted only through the flanks of the teeth which are small. The high overturning torques may damage the teeth. Also, a relatively large displacement is needed for engaging and disengaging the false jaws, the overall dimensions are too large due to the screwed strips, and dirt readily deposits between the teeth.

SUMMARY OF THE INVENTION

The present invention is directed to an arrangement insuring not only an extraordinarily good backing of the false jaw resulting in a high stability but also improving the economy in manufacture and making the connection of a false jaw to a master jaw easy. It is provided to make the false jaw bear directly against the master jaw, and to guide it laterally, so that even strong forces can be taken up by the false jaw without a risk of damages. Further, the displacement for engaging a false jaw with a master jaw and the overall axial height are to be small, and internal as well as external chucking is to be made possible without constructional changes and while preserving a high accuracy in clamping.

In accordance with the invention a chuck is provided which includes a master jaw which is connected to the chuck body and has an axial outer side with an axial extension defining a stop surface portion and a locking nose portion of larger dimension than the stop surface portion with a relief shoulder being defined therebetween. A false jaw has an axial inner wall with a recess into which the axial extension of the master jaw extends when the false jaw is to be coupled to the master jaw. The recess of the master jaw has an interior side wall with an inner groove into which the nose portion of the false jaw engages. The false jaw is held to the master jaw by engagement of the extension of the master jaw into the recess of the false jaw in a manner such that the nose portion of the extension engages into a groove behind a relief shoulder defined in the recess of the master jaw, so that the false jaw is held non-rotatably with its shoulder portion engaging against a relief shoulder defined in the recess of the false jaw. This construction advantageously includes the false jaw having a bore which extends from the recess to an opposite wall and which contains a ball biased by a spring into engagement with a recess which is provided on the head of the nose portion of the extension of the master jaw. With this provision the false jaw becomes well locked into engagement with the master jaw and no unaided loosening of the connection between the two jaws is possible.

Advantageously, the extension of the master jaw may be formed by a neck which is integral with or secured to the extension and which has a circular or oval cross section with a radially projecting nose part formed by a circular or semi-circular head. The relief shoulder of the recess groove in the false jaw engages the head of the extension. The construction of the extension is such that it is easy to manufacture and with the relief shoulder extending in a radial direction, the seating of the false jaw on the master jaw is made secure.

The inventive arrangement is extremely simple in construction, thus also invexpensive in manufacture, and easy to handle, while still guaranteeing a safe hold of a false jaw in a master jaw. That is, the locking projection of the extension and the relief shoulder in the recess of the false jaw permit an easy interengagement of the two jaws by a short radial displacement. Due to this connection, the false jaw applies in the clamping direction against the master jaw directly and over a large surface, and in the direction of rotation against the chuck body, so that even strong forces can be transmitted without risking damages.

Since the master jaw engages, by the extension, directly the false jaw and no screwed parts are provided, a considerable stability is obtained. Further, no high accuracy is required for the machining of the extension and the recess, and no high costs are incurred, especially when a rotationally symmetrical shape is provided. In the radial direction, the false jaw applies against the extension, so that true running and repeated accuracy in clamping are insured. Another advantage is that, with the master and false jaws interengaged, no dirt can pass therebetween, and that is necessary, both the extension and the recess can easily be cleaned.

The radial guidance of the false jaw in the chuck body makes sure that the false jaw is secured against rotation and, in addition, that upon a jaw change and insertion into the guide groove, the new jaw is instantly exactly aligned with the extension. Since the false jaw penetrates into the chuck body, the overall constructional length of the chuck is decreased and the weight of both the master jaw and the false jaw can be lowered, so that the occurring centrifugal forces are reduced. A particular advantage is that due to the inventive design, a change from external chucking to internal chucking and vice versa may easily be effected by simply turning the false jaws upside down and reversing the motion of the master jaws.

Accordingly, it is an object of the invention to provide a chuck construction which includes a master jaw having means for securing a false jaw thereto and which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
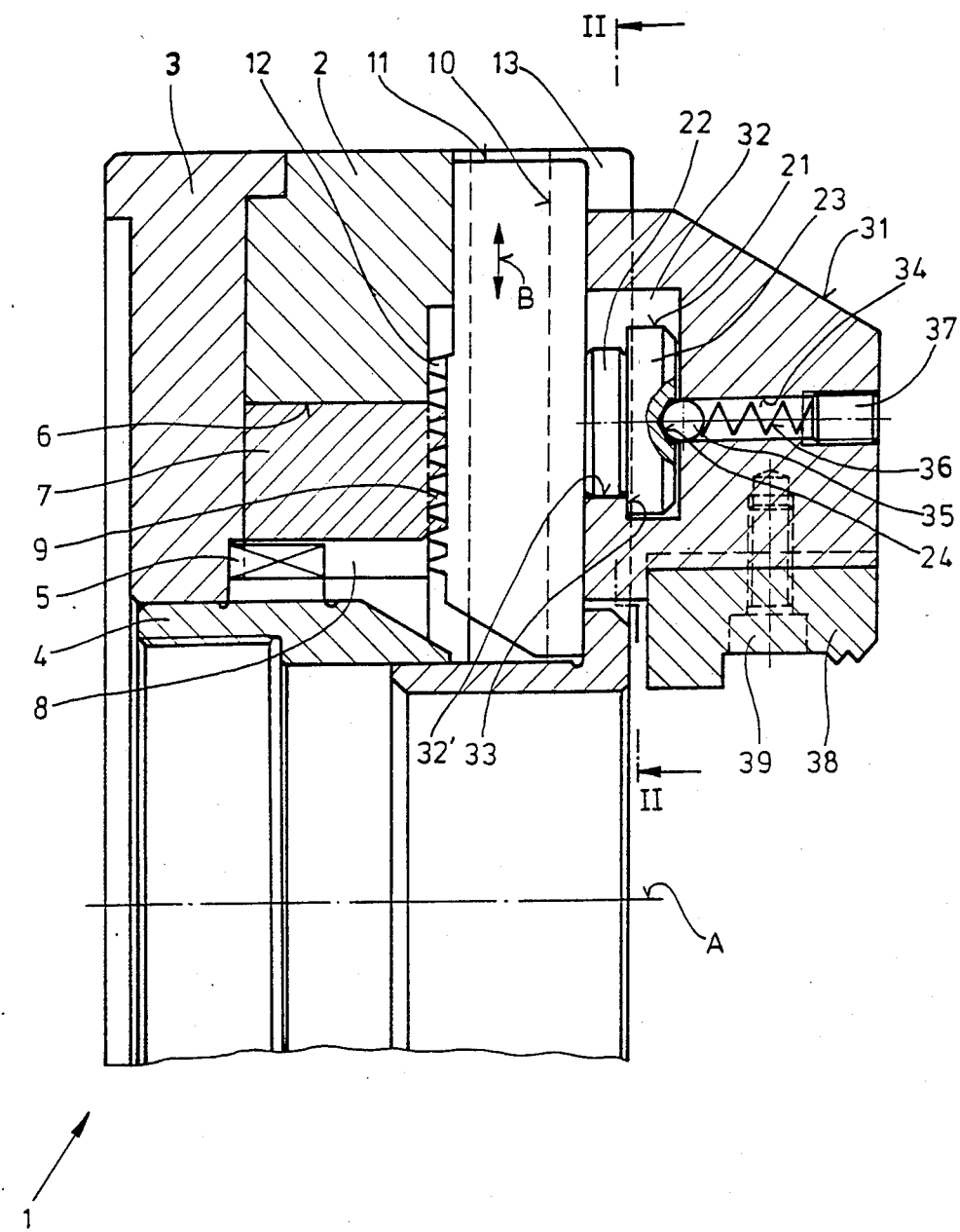
FIG. 1 is an axial sectional view of a power chuck having radially displaceable master jaws and false jaws coupled thereto.
Figure 2:
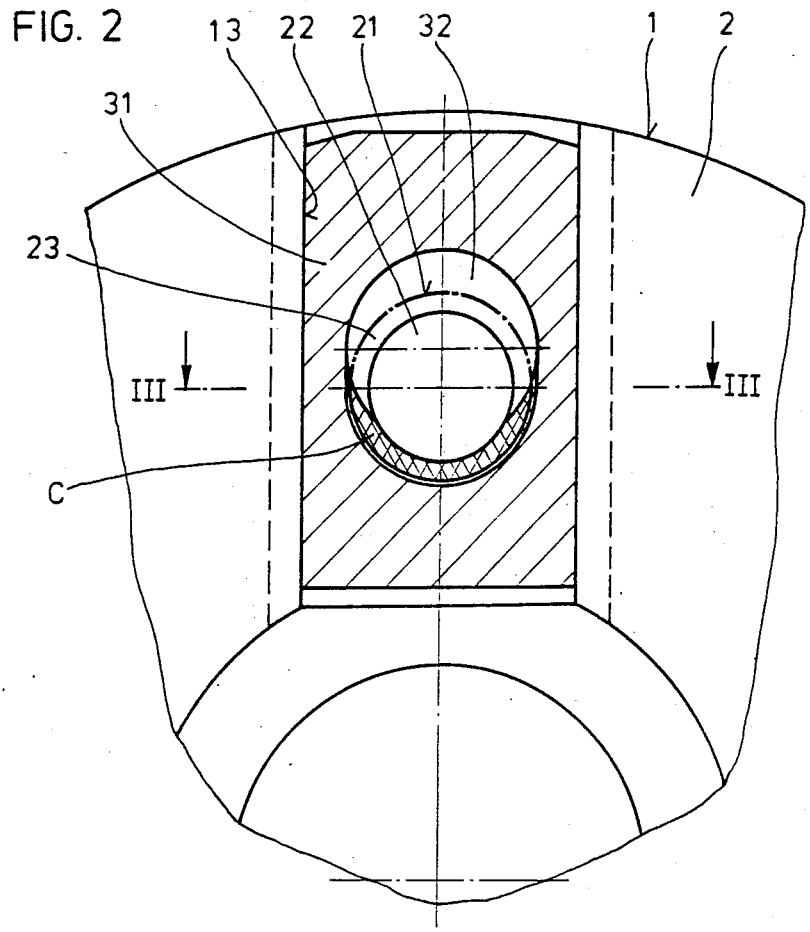
FIG. 2 is a sctioanal view taken along the line II—II of FIG. 1.
Figure 3:
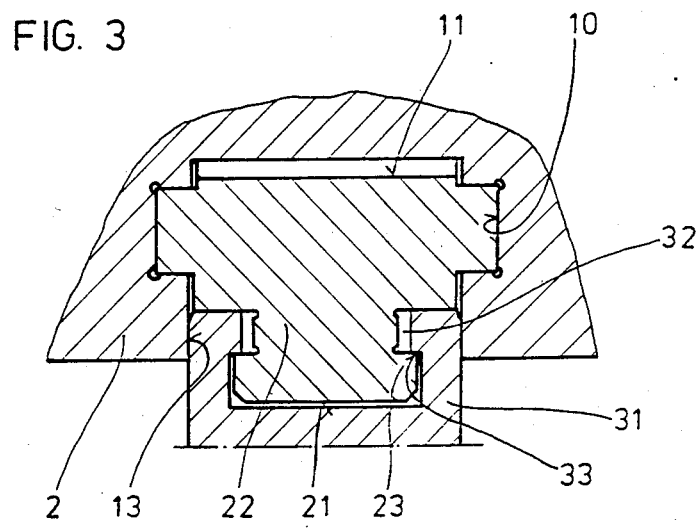
FIG. 3 is a sectional view taken along the ling III-—III of FIG. 2.

Referring to the drawings in particular the invention embodied therein in FIGS. 1-3 comprises a chuck jaw construction for a chuck body 2 which includes a master jaw 11 connected to the body and having an axial outer side with a fixed mushroom-shaped axial extension 21 which defines a shank or stop surface portion 22 and an outer locking nose portion or head 23 of larger dimension in the outer radial direction, at least, than the stop surface portion. A relief shoulder 33 is defined between the stop surface portion 22 and the nose portion 23. A false jaw 31 may be mounted easliy to the master jaw 11 and it is provided with an axial inner wall with a recess 32 into which the extension 21 is engaged when the false jaw is to be employed with the master jaw 11. The recess of the false jaw has an interior side wall 32' which defines a mating surface with an inner groove into which the locking nose portion 23 of the extension is engaged. The locking nose 23 is held against rotation in the inner groove with its shoulder portion engaging against the relief shoulder 33 with the stop surface 22 engaging on the mating surface 32'.

The power operated chuck 1 shown in FIG. 1 comprises a plurality of, preferably three, master jaws 11 which are guided for displacement in radially extending grooves 10 provided in, and uniformly distributed over, the circumference of a chuck body 2, and protrude into recesses 13 which are provided in front of the grooves. The master jaws are movable by means of a central actuating piston 4 through wedge bars 7. For this purpose, wedge bars 7 are inserted in tangential chuck body recesses 6 closed by a cover 3, and provided each with a key seat 8 which is engaged by a gib key 5 of piston 4, and further provided with teeth 9 meshing with opposite teeth 12 of master jaw 11. Since key seats 8 and engaging gib keys 5 are inclined in the axial direction, an axial displacement of piston 4 is transformed into a radial displacement of master jaws 11.

Each master jaw 11 is engaged, namely detachably connected, with a false jaw 31. For this purpose, master jaw 11 has, an extension 21 which can be introduced into a recess 32 provided in false jaw 31, and locked therein. In the embodiment of FIGS. 1-3, extension 21 is formed by a neck portion 22 having a circular cross section and a production provided thereon and having the shape of a head or locking nose 23. Recess 32 is also rotationally symmetrical and has a diameter which is larger than that of the head 23, so that extension 21 can be introduced into the recess 32 easily.

To permit coupling of extension 21 to the false jaw 31, a radially extending relief shoulder 33 is provided in a side wall of recess 32, with which head 23 of extension 21 can be engaged and which is formed by a circularly turned portion. Therefore, in a coupled position, head 23 of the extension 21 applies against the false jaw 31 in the crescent-shaped area designated C in FIG. 2, which is a large surface perpendicular to the axis of the chuck and perpendicular to the radial direction of the chuck. In the radial direction, the locking is effected by neck 22 applying against recess wall portion 32' adjoining relief shoulder 33 of recess 32. In addition, false jaw 31 is held in recess 13 laterally and thus secured against rotation. Recess 13 and the way in which false jaw 31 engages that recess is an example of anti-rotation means for securing false jaw 31 to chuck body 2, against rotation. Due to this fit in the recess 13, false jaw 31 is necessarily brought into its correct position, and no particular alignment is needed.

The mutual coupling of the two jaws is effected simply by moving false jaw 31 in the axial direction A of chuck 1 so as to introduce extension 21 of master jaw 11 into recess 32. With this introduction completed, one of the jaws, preferably the master jaw 11, is moved radially until neck 22 applies against the mating surface. Since relief shoulder 33 extends in the radial direction and false jaw 31 applies against master jaw 11 by its front face turned thereto, even very strong forces can easily be transmitted. Further, an external chucking arrangement can easily be changed to an internal one without any constructional modifications or other provision, simply by turning false jaw 31 through 180°.

To prevent false jaw 31 from unintended unclamping, a bore 34 is provided in the jaw, with a ball 35 received therein, and a conical recess 24 is provided in extension 21 of master jaw 11. In coupling position, ball 35 which is loaded by a spring 36 bearing against a screw 37 by which bore 34 is closed, engages recess 24 so that false jaw 31 is safely locked to master jaw 11. These element form radial fixing means which are engaged between the extension 21 and the jaw 31 in its recess 32.

In the embodiment of FIG. 1, false jaw 31 is designed as a cassette to which a jaw insert 38 is secured by means of screws 39. Since insert 38 which is propped in the clamping direction B can easily be changed, no difficulty arises in adapting false jaw 31 to varying clamping diameters.

Figure 4:
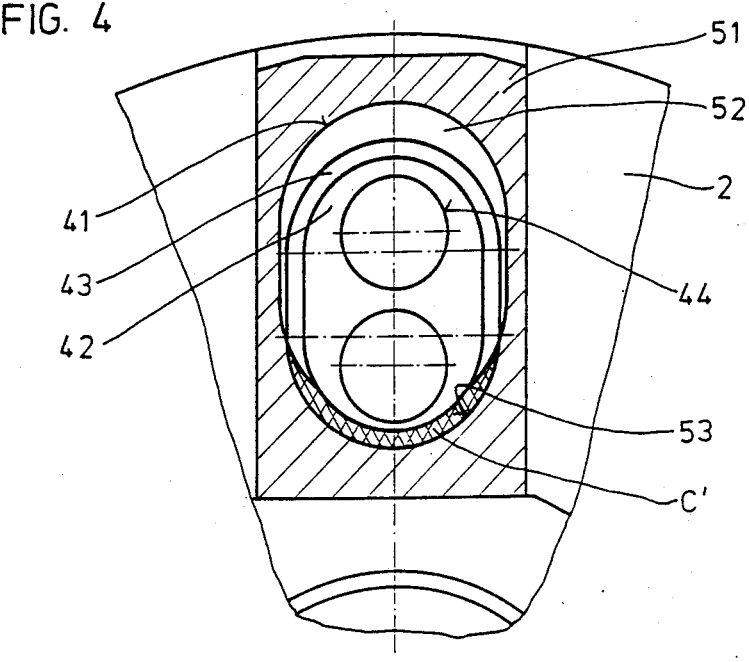
FIG. 4 is a view similar to FIG. 2 showing the chuck of FIG. 1 having differently designed connecting portions.
Figure 5:
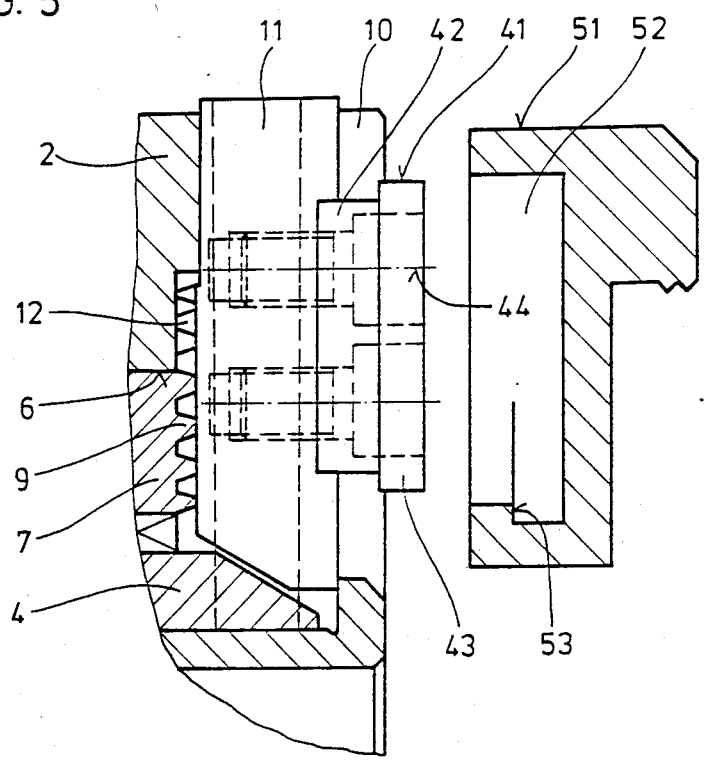
FIG. 5 shows the chuck of FIG. 4 with the false jaw disengaged.

In the embodiment of FIGS. 4 and 5, extension 41 of master jaw 11 comprises a basic body 42 and a projecting head having an oval cross section. Extension 41 is secured to master jaw 11 by screws 44. Recess 52 provided in false jaw 51 is conformable to head 43, only slightly larger, and made with a relief shoulder 53 which becomes engaged by head 43 in coupling position. The area over which head 43 applies against false jaw 51 is indicated at C' in FIG. 4.

Figure 6:
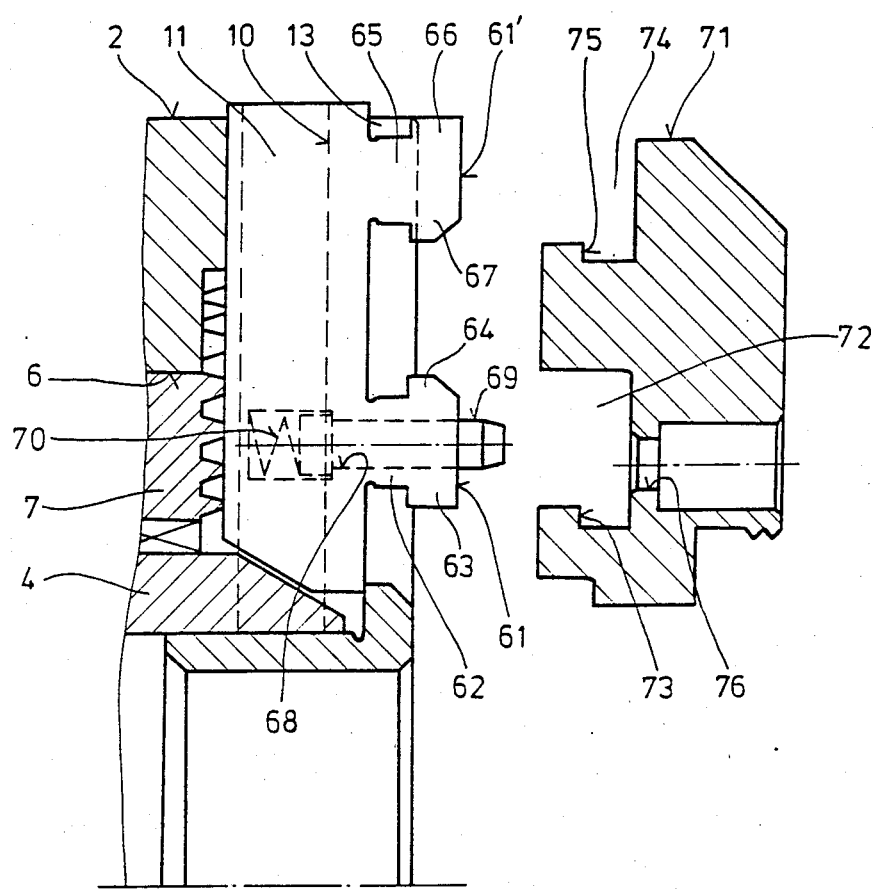
FIG. 6 is an exploded axial view of another design of the connecting portions between the master jaw and the false jaw.

In the embodiment of FIG. 6, master jaw 11 is provided with two extensions 61, 61' protruding in the axial direction and having rectangular cross sections. Each extension comprises a basic body 62, 65 and one inwardly and one outwardly extending projections, 63,64 and 67,66 respectively. False jaw 71 is provided with recesses 72,74 corresponding to extensions 61,61' and having relief shoulders 73,75.

With false jaw 71 coupled to master jaw 11, projection 63 is locked with shoulder 73 and projection 67 is locked with shoulder 75. If false jaw 71 is connected to master jaw 11 in an upside down position, projection 64 becomes locked with shoulder 75, and projection 66 with shoulder 73. This double locking makes sure that even if the radially extending projections and shoulders are short, the false jaws are safely locked in place.

In this embodiment, false jaw 71 is arrested by means of a locking bolt 69 which is inserted in master jaw 11 and loaded by a spring 70, and by which in the coupling position a bore 76 of false jaw 71 is engaged.

While specific embodiments of the invention have been shown and described in detail to illustrate the application of the principles of the invention, it will be understood that the invention may be embodied otherwise without departing from such principles.

What is claimed is:

1. A jaw construction for a chuck body that is rotatable about an axis extending in an axial direction, comprising a master jaw connected to the body and having an axial outer side with a fixed axial extension defining an inner stop surface portion and an outer locking nose portion of larger radial dimension than said inner stop surface portion and with a radial relief shoulder defined between the stop surface portion and said locking nose portion at opposite radial ends of said extension, a false jaw having an axial inner wall engaged with said axial outer side and having a recess shaped to receive said extension by insertion in the axial direction and into which said extension extends when said false jaw is engaged with said master jaw, said recess of said false jaw having a mating surface and an inner groove into which said locking nose portion engages with said stop surface engaging on said mating surface, said shoulder engaging over a radially extending side of the groove in an area extending perpendicular to the radial and axial directions of the chuck with respect to the axis, and anti-rotation means engaged with said false jaw for preventing rotation thereof with respect to said master jaw.

2. A jaw construction according to claim 1 wherein said anti-rotation means comprise said false jaw having a pair of radially extending surfaces mating with radially extending surfaces of the chuck body, the jaw construction including radial fixing means engaged between said outer lock nose portion and said false jaw in said recess of said false jaw.

3. A jaw construction according to claim 2, wherein said false jaw includes a bore extending into the recess, said radial fixing comprising a ball carried in the bore, said extension having a formation in its outer wall to which said bore is engageable and spring means urging said ball into engagement to positively lock said false jaw to said master jaw.

4. A jaw construction according to claim 2, wherein said extension of said master jaw includes a neck portion of substantially circular cross section and said locking nose portion is of substantially circular formation, said extension comprises an integral part.

5. A jaw construction according to claim 2, wherein said master jaw nose portion extends to each side of said inner stop surface portion and has a substantially rectangular cross section.

6. A jaw construction according to claim 5, wherein said master jaw includes a second axial extension radially spaced from said first-mentioned axial extension, said second axial extension having a second inner stop surface portion and a second outer locking nose portion of larger dimension than said second inner stop surface portion with a second release shoulder defined between said second stop surface and said second locking nose portion on both radial ends of said second axial extension, said false draw having a second recess shaped to receive said second extension by insertion in the axial direction and into which said second extension extends when said false jaw is engaged with said master jaw, said second recess having a mating surface on an inner groove thereof into which said second locking nose portion engages with said second stop surface engaged on said mating surface, said second shoulder engaging over a radially extending side of said second groove in a second area extending perpendicular to the radial and axial direction of the chuck body.

7. A jaw construction according to claim 2, wherein said false jaw has a jaw insert mounting surface and means for clamping a jaw insert to said mounting surface.

8. A jaw construction according to claim 2, wherein said extension of said master jaw includes a neck portion of substantially oval cross-section and said locking nose portion is of substantially oval formation, said recess of said false jaw also being oval in cross-section.

9. A jaw construction according to claim 8, wherein said anti-rotation means comprises said chuck body having a radially extending recess, said false jaw having radial sides engaged with said radial recess forming said radially extending surfaces.

10. A jaw construction for a chuck body that is rotatable about an axis extending in an axial direction, comprising a master jaw connected to the body for movement in a radial direction with respect to the axis and having an axial outer side with a fixed mushroom-shaped axial extension having a shank with a curved inner stop surface and an outer locking head of larger radial dimension than said shank, said extension having a radially extending relief shoulder defined between said shank and said locking head at opposite radial ends of said extension and around said shank, a false jaw having an axial inner wall engaged with said axial outer side and having a recess shaped to receive said extension by insertion in the axial direction and into which said extension extends when said false jaw is engaged with said master jaw, said recess of said false jaw having a curved mating surface and an inner groove into which said locking head engages with said curved stop surface engaging on said curved mating surface, said shoulder on one radial end of said extension engaging over a radially extending side of the groove in a crescent-shaped area extending perpendicular to the radial and axial directions of the chuck body, anti-rotation means engaged with said false jaw for preventing rotation thereof with respect to said master jaw, and radial fixing means engaged between said extension and said false jaw in said recess of said false jaw to hold said false jaw in a fixed radial position on said main jaw.

11. A jaw construction according to claim 10, wherein said shank and head of said mushroom-shaped axial extension are both circular in radial cross-section, said radial fixing means being engaged between said extension and said false jaw near a center of said circular head.

12. A jaw construction according to claim 11, wherein said anti-rotation means comprises said chuck body having a radially-extending recess, said false jaw having radial sides engaged with said radial recess.

13. A jaw construction according to claim 12, wherein said said false jaw includes a bore extending into the recess, said radial fixing means comprising a ball carried in the bore, said extension having a formation in its outer wall into which said bore is engageable and spring means urging said ball into engagement with said formation to positively lock said false jaw against radial movement on said master jaw.

* * * * *